Dec. 10, 1968    R. E. MIERENDORF    3,416,038
BIASED SILICON CONTROL RECTIFIER CONTROL APPARATUS
Filed Jan. 24, 1966
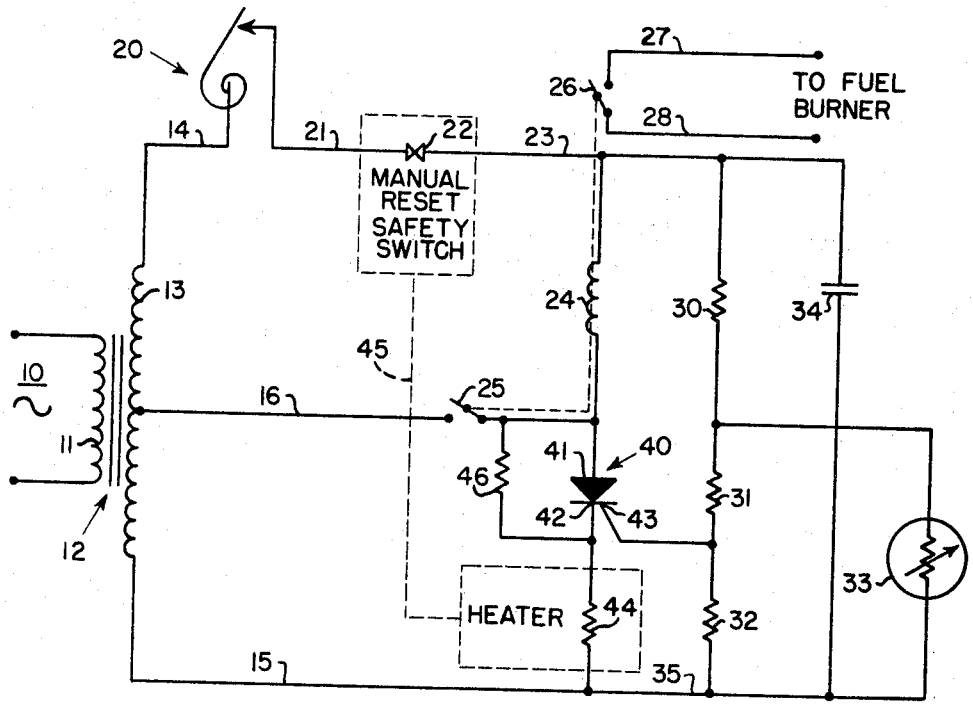
INVENTOR.
ROBERT E. MIERENDORF
BY Alfred N. Feldman
ATTORNEY

United States Patent Office 3,416,038
Patented Dec. 10, 1968

3,416,038
BIASED SILICON CONTROL RECTIFIER
CONTROL APPARATUS
Robert E. Mierendorf, Minneapolis, Minn., assignor to Honeywell Inc., Minneapolis, Minn., a corporation of Delaware
Filed Jan. 24, 1966, Ser. No. 522,586
5 Claims. (Cl. 317—132)

ABSTRACT OF THE DISCLOSURE

A silicon controlled rectifier control apparatus energized from an alternating current supply and having a control means in the form of a relay energized through the silicon controlled rectifier. A bias network including the control means and a resistance network so that a back bias or reverse bias is present in the gate and cathode circuit of the silicon controlled rectifier. A forward or positive bias applied to the gate of the silicon controlled rectifier and responsive to a condition to be sensed.

---

The present invention is directed to a control apparatus utilizing a silicon controlled rectifier as a switching means, and more particularly directed to a fuel burner control circuit in which a silicon controlled rectifier replaces the normal combustion responsive switch. In this particular invention, the means of biasing the silicon controlled rectifier in a safe and unusual manner forms the heart of the invention.

The present invention is an improvement of a burner control circuit of a type generally disclosed in the United States Patent No. 2,080,580 to Shaw which issued on May 18, 1937. The circuit disclosed is a burner control protective arrangement wherein the safety switch heater of the burner control is energized from a relatively high voltage initially and then is reduced to a lower voltage upon operation of an associated relay. The safety switch which connects the main power supply to the burner and motor is in turn controlled by a combustion responsive switch. The system as disclosed in the Shaw patent is considerably out of date in that the combustion switch can readily be replaced by more reliable switching devices such as a silicon controlled rectifier and a photo-resistive cell. The mere substitution of a silicon controlled rectifier and photoresistive cell for the switching function provided in the combustion switch circuit, in and of itself, is not deemed to be a step unobvious to one working in the present art. The substitution of a silicon controlled rectifier for the combustion switch, however, creates a condition which may be unsafe under certain circumstances. More specifically, the unsafe condition exists if the voltage to the main transformer suddenly drops at the time of initiation of the control relay thereby changing the relationship of the bias to the silicon controlled rectifier in such a manner as to cause the device to improperly sense the condition of the supervised flame.

The present invention recognizes that it would be obviously to modify the Shaw patent by the substitution of a silicon controlled rectifier, and photoresistive cell but goes beyond this point in providing a peculiar type of biasing network for the silicon controlled rectifier wherein an unsafe condition cannot exist. The present invention is specifically directed to a biasing arrangement for the the silicon controlled rectifier and the balance of the bias is controlled by a photoresistive cell, such as a cadmium sulfide cell that is responsive to the output of the combustion being monitored. In addition to the combination silicon controlled rectifier wherein the safety switch heater of the controlled circuit provides a portion of the bias for tion of the biasing arrangement from the two sources, the voltage applied to the silicon controlled rectifier and the safety switch heater changes in such a manner as to provide a condition wherein the bias to the silicon controlled rectifier at its gate always insures that the silicon controlled rectifier is turned off when the photoresistive cell notes the existence of the appropriate flame in the burner system.

The present invention will be explained in detail in connection with the attached drawing wherein the sole figure is a circuit of the invention applied to a burner control circuit.

In the drawing a conventional source of alternating current is disclosed at 10 connected to the primary winding 11 of a step-down transformer generally shown at 12. The step-down transformer 12 has a tapped secondary winding 13 having two outer connections 14 and 15 along with the tap connection 16. The connection 14 leads to a thermostat means 20 which is of any conventional design. The thermostat means 20 is connected by lead 21 to a pair of normally closed safety switch contacts 22. The safety switch contacts 22 are of a conventional manual reset type, well known in the burner control art. The safety switch contacts 22 are further connected by conductor 23 to a relay coil 24 that in turn is connected through one of its own normally open contacts 25 to the tap connection 16. The relay coil 24 also has a second normally open contact 26 that leads to a pair of conductors 27 and 28 that control the load means for the system. The load means in this particular case is a fuel burner. This notation has been placed on the drawing for convenience sake. It will be noted that the relay coil 24 and its associated contacts can be considered as an electrically energizable control means that has a first and a second condition of operation which includes an actuator and which upon energization causes the control means to assume a second condition of operation. The relay coil 24 also can be further considered as part of the control means wherein a memory exists to maintain the control means in the energized position in the absence of an energizing potential for a period of time at least as long as a half cycle of the alternating current supply. This is the normal function of any alternating current relay, such as one that contains a shading ring for overlap of the magnetic flux to keep the device in an energized condition as the voltage passes through zero.

The conductor 23 in the present circuit can also be considered as a first terminal to which the circuit is generally connected and to which the alternating current source voltage is applied. The conductor 23 also connects to a voltage divider network formed of resistors 30, 31 and 32 along with a cadmium sulfide cell 33 that shunts the resistors 31 and 32 which is a forward bias resistor. The cadmium sulfide cell 33 is a well-known photoresistive cell that has a relatively low value of resistance when a light is present and a relatively high value of resistance when there is no light or flame present. As a result of this, the cell 33 forms a means of varying the potential in the voltage divider network depending on the condition of the light at the cell 33.

The circuit also contains a capacitor 34 connected between the conductor 23 and a conductor 35. This capacitor is for transient voltage suppression and is not essential to the operation of the circuit but shows the circuit in a preferred configuration. The conductor 35 forms a second terminal to which the alternating current source is applied by means of the conductor 15 from the secondary winding 13 of the transformer 12.

Connected between the relay coil 24 and the conductor 35 is a silicon controlled rectifier generally disclosed at 40 having an anode 41, a cathode 42, and a control grid or gate 43. Connected between the gate 43 and the cathode 42 is the resistor 32 of the bias network and another resistor 44 which is a back bias resistor. The resistor 44 in fact is the heater element for the manual reset safety switch 22 shown adjacent the thermostat means 20. These two elements are normally located adjacent one another but have been shown separated in the present drawing for convenience. The relationship in physical positioning is shown by the dashed line 45. To complete the present circuit a bias resistor 46 is connected between the anode 41 and the cathode 42 of the silicon controlled rectifier 40.

Operation

In the normal operation of the device disclosed, the potential applied to the transformer 12 is step-down to a low voltage level for appropriate application to the system. With the thermostat means 20 open, the relay coil 24 is of course de-energized and the system keeps the relay contact 26 open thereby keeping the fuel burner off. As soon as a call for heat exists, thermostat means 20 closes thereby applying a potential to terminal 23 across the relay coil 24 and the silicon controlled rectifier 40 along with the resistor or heater 44 to the conductor 15. The voltage across resistor 44 forms a back bias for the silicon controlled rectifier 40. At the same time this potential is applied across the voltage divider network made up of the resistors 30, 31, 32 and the cadmium cell 33. With this arrangement of resistances and the cadmium cell 33 in a dark condition during the positive half cycle, the forward bias voltage across the resistor 32 is sufficiently positive to cause the silicon controlled rectifier 40 to fire thereby conducting to energize the relay coil 24 to pull in the relay contacts 25 and 26. As soon as the contact 26 closes, power is applied to the fuel burner to put it into operation and also a holding circuit is provided by contact 25 to the relay coil 24 through the thermostat means 20. The operation of contact 25 also at this time applies the center-tap 16 to the anode 41 of the silicon controlled rectifier 40. This lowers the potential to the anode 41 and also lowers the voltage applied to the voltage divider network made up of the safety switch heater 44 and the resistor 46. As a result of this, the potential across the safety switch heater 44 drops significantly. This drop keeps the silicon controlled rectifier 40 in a state of conduction due to the potential generated across the bias resistor 32.

As soon as the cadmium cell 33 senses a light condition indicating the burner has come into operation, the resistance in parallel with the resistors 31 and 32 drops significantly. This immediately causes the voltage appearing across resistor 32 to drop to a sufficient level to turn off the silicon controlled rectifier 40. This removes the current flowing through the silicon controlled rectifier 40 and through the safety switch heater 44 thereby placing the system in an operating mode indicating that a safe flame-proved condition exists. During the alternate half cycle of the applied source 10, the relay remains energized even though the silicon controlled rectifier does not conduct.

It will be noted that the present arrangement provides two distinct bias conditions for the silicon controlled rectifier 40. Initially, the potential applied to the silicon controlled rectifier is quite high and the associated bias generated across the safety switch heater 44 is a fairly significant portion of the bias generated across the resistor 32. This insures that should the potential applied to the overall circuit suddenly decrease due to a line variation or other condition, that the silicon controlled rectifier 40 would continue conducting until the photoresistive cell changes value indicating the presence of flame. With the shift in bias both on the silicon controlled rectifier 40 as represented by the voltage across the safety switch heater 44 and the associated drop in the voltage across resistor 32, the present circuit cannot falsely indicate the presence of a flame when the condition actually was merely a momentary drop in line voltage. This is a condition which can readily occur in the present type of equipment due to the loading of the line by the application of power to relay coil 24 and the associated equipment in the burner system.

In the present invention it thus becomes apparent that the deficiencies of the mere substitution of a silicon controlled rectifier as a switching means in a circuit of the type disclosed in the Shaw patent has been overcome. The utilization of the safety switch heater and a second biasing network provides a bias arrangement for the silicon controlled rectifier along with a reduction in voltage to the silicon controlled rectifier in such a manner as to provide a safe, reliable, and cheap expedient for control of fuel burners. It is obvious that the present circuit could be modified in further ways that would be well contemplated by one versed in the present art and therefore the inventor wishes to be limited in the scope of his invention only by the appended claims.

I claim as my invention:

1. Control apparatus comprising: a pair of terminals adapted to be connected to an alternating current source of voltage; a silicon controlled rectifier having an anode, a cathode and a gate; impedance means; electrically energizable control means having a first and a second condition of operation including an actuator which when energized causes said control means to assume said second condition of operation; said control means further having a memory to maintain said control means in said second position of operation in the absence of energization of said actuator for a time period at least as long as a half cycle of the alternating current source; circuit means connecting said actuator between the anode of said silicon controlled rectifier and one of said terminals and connecting said impedance means between the cathode of said silicon controlled rectifier and other of said terminals; bias voltage supply means connected to said impedance means to apply a back bias voltage to said cathode; means including said control means to control said bias voltage supply means to apply a high voltage to said cathode when said control means is in said first condition of operation and to apply a lower voltage to said cathode when said control means is in said second condition of operation; and variable condition responsive voltage supply means connected to said gate to apply a variable forward bias voltage thereto.

2. Control apparatus as described in claim 1, wherein said variable condition responsive voltage supply means includes a condition responsive resistance in circuit with voltage divider network means connected to said pair of terminals.

3. Control apparatus as described in claim 1, wherein said electrically energizable control means is alternating current responsive relay means including said actuator and having at least two normally open contacts; a first of said contacts connected to apply said bias voltage supply means to said cathode and a second of said contacts adapted to operate load means in response to operation of said relay means.

4. Control apparatus as described in claim 3, wherein said variable condition responsive voltage supply means includes a condition responsive resistance in circuit with voltage divider network means connected to said pair of terminals.

5. A control apparatus as described in claim 4 including thermostat means in circuit with said alternating current source of voltage to conditionally apply voltage from said terminals; said thermostat means further connected through safety switch contact means to said relay means; said impedance means forming an operator for said safety switch contact means to operate said contact means in the event said gate voltage does not turn said silicon controlled rectifier off after a fixed time period after said thermostat means has operated.

References Cited

UNITED STATES PATENTS

| | | | |
|---|---|---|---|
| 3,315,135 | 4/1967 | Thiele | 317—132 X |
| 3,294,974 | 12/1966 | Riebs | 250—206 |
| 3,258,655 | 6/1966 | Pinckaers | 317—132 |
| 3,089,065 | 5/1963 | Worden | 317—132 X |

LEE T. HIX, *Primary Examiner.*

J. A. SILVERMAN, *Assistant Examiner.*

U.S. Cl. X.R.

317—148.5; 307—296, 305